United States Patent [19]

Chertock, deceased et al.

[11] 4,332,640
[45] Jun. 1, 1982

[54] VIBRATING FUEL GRAPPLE

[75] Inventors: Alan J. Chertock, deceased, late of San Francisco, Calif., by Theodore E. Hlavac, Jr., beneficiary; Jack N. Fox, San Jose; Robert B. Weissinger, Santa Clara, both of Calif.

[73] Assignee: The United States of America as represented by the United State Department of Energy, Washington, D.C.

[21] Appl. No.: 34,229

[22] Filed: Apr. 30, 1979

[51] Int. Cl.³ ............................................. G21C 19/20
[52] U.S. Cl. ................................ 376/264; 294/86 A; 414/146
[58] Field of Search ....................... 176/30; 294/86 A; 414/146; 166/177; 175/55

[56] References Cited

U.S. PATENT DOCUMENTS 3,950,020  4/1976  Hoffmeister ........................... 176/30
4,204,910  5/1980  Kosnkin ................................ 176/30

FOREIGN PATENT DOCUMENTS 159775  1/1964  U.S.S.R. .................. 175/55
432284  6/1974  U.S.S.R. .................. 175/55
501152  1/1976  U.S.S.R. .................. 175/55

OTHER PUBLICATIONS

Fox, GEFR-14031-11, May 1977 "Core Restraint Engineering" *11th Quarterly Report.*

*Primary Examiner*—Donald P. Walsh
*Attorney, Agent, or Firm*—L. E. Carnahan; Roger S. Gaither; James E. Denny

[57] ABSTRACT

A reactor refueling method utilizing a vibrating fuel grapple for removing spent fuel assemblies from a reactor core which incorporates a pneumatic vibrator in the grapple head, enabling additional withdrawal capability without exceeding the allowable axial force limit. The only moving part in the vibrator is a steel ball, pneumatically driven by a gas, such as argon, around a track, with centrifugal force created by the ball being transmitted through the grapple to the assembly handling socket.

10 Claims, 2 Drawing Figures

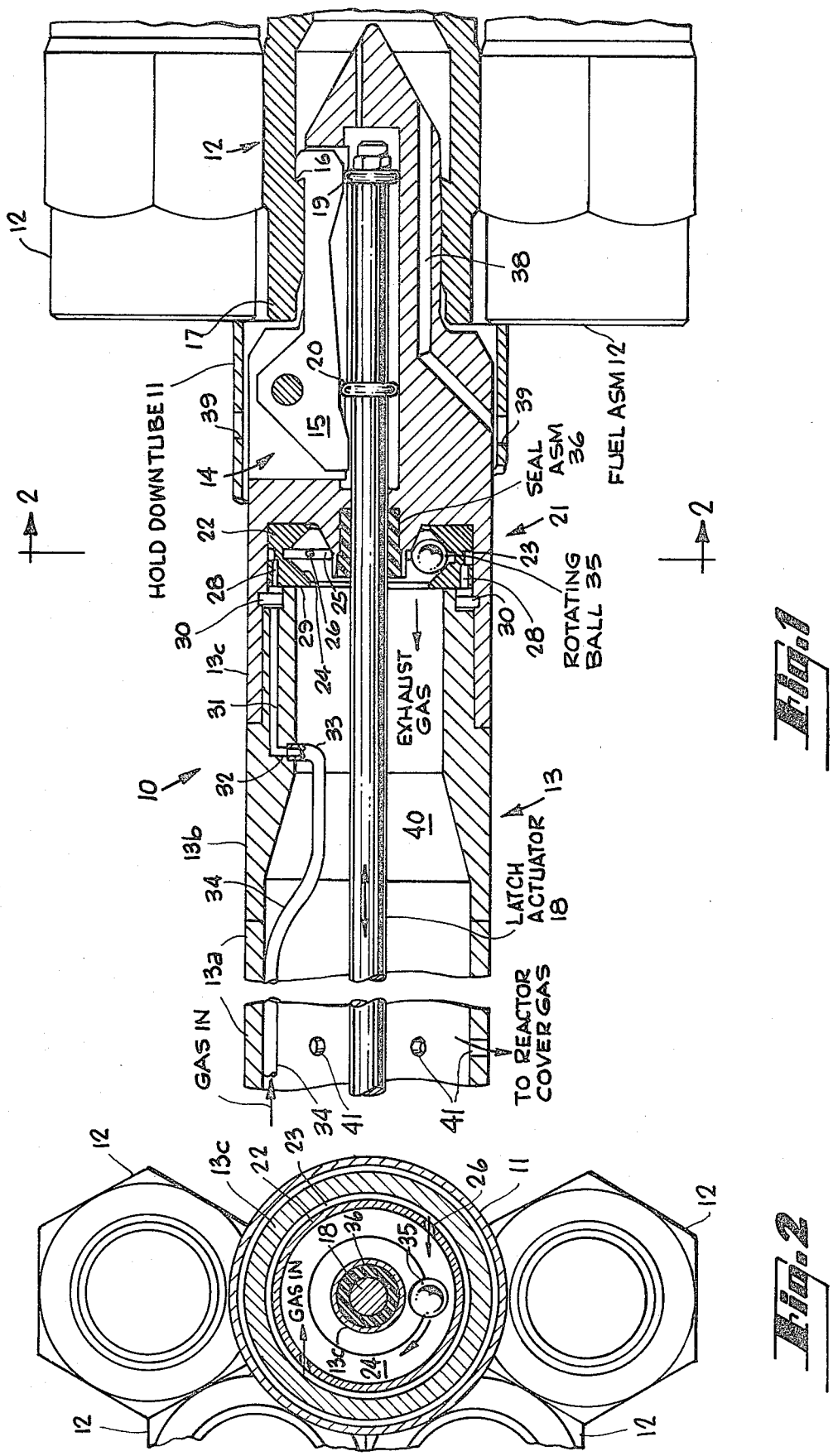

VIBRATING FUEL GRAPPLE

BACKGROUND OF THE INVENTION

The invention described herein was made in the course of, or under, Contract No. EY-76-C-03-0893, Tasks 23 and 31 between General Electric Company and the United States Department of Energy.

The invention relates to refueling mechanisms for reactors, particularly to a fuel grapple for removing spent fuel assemblies from a reactor core, and more particularly to a vibrating fuel grapple for enabling additional withdrawal capability.

Reactor refueling operations remove fuel assemblies at refueling by applying an axial force greater than the assembly weight. With significant friction forces due to the design, environment and material behavior, the axial force will have to be large enough to overcome these friction forces also. The refueling approach to these concerns has been to limit allowable withdrawal loads to an assumed safe level.

In liquid metal fast breeder reactor (LMFBR) core restraint systems, the current design trend is for a restrained system which utilizes above-core and top load pads and formers along with a nozzle/receptacle restraint at the bottom of the core assemblies. The operating environment of an LMFBR exposes core structural materials to temperature and fast-flux irradiation gradients. Core structural materials exposed to fast-flux irradiation exhibit swelling and creep behavior as a function of irradiation and time. The combined effects of the restrained components, the environment and the material behavior, result in core assemblies with permanently bowed shapes which interact within the core restraint system. This condition results in load interactions, on the cores fuel assemblies, which, as a result of friction, produce retraining loads on the assemblies. This tends to prevent easy removal of assemblies for refueling at end of life (with the design trend to larger cores for commercial reactors, these loads could be significantly large). In addition, the existence of these friction loads can cause damage to remaining adjacent assemblies. Significant changes to remaining fuel assembly surfaces can cause undesirable operational stick-slip behavior and create difficulties for future refueling operations.

It is thus seen that it is extremely difficult to predict accurately the load pad normal forces and ultimately the force required to withdraw or insert an LMFBR core fuel assembly at refueling, since the accuracy of such load predictions is subject to the uncertainties in the operational environment, creep and swelling correlations, and the uncertainties of pad-to-pad and nozzle-to-receptacle friction coefficients. Thus, it is possible that actual withdrawal loads will exceed core fuel assembly withdrawal force design limits.

Various mechanisms exist in the prior art for removing assemblies, fuel and control, from the core of nuclear reactors. These prior efforts are exemplified by U.S. Pat. No. 3,151,033 issued Sept. 29, 1964; No. 3,175,854 issued Mar. 30, 1965; No. 3,801,148 issued Apr. 2, 1974; No. 3,856,621 issued Nov. 24, 1974; and No. 3,950,020 issued Apr. 13, 1976.

Apparatus is known for dislodging stuck elements, such as well pipe, drilling bits, etc. where accoustic energy or vibration is utilized. These prior approaches for removing stuck items are exemplified by U.S. Pat. No. 3,132,707 issued May 13, 1964; No. 3,399,724 issued Sept. 3, 1968; and No. 4,058,163 issued Nov. 15, 1977. The latter patent, for example, uses an eccentric weight which is rotated by means of a pressurized fluid, wherein the rotation of the eccentric weight results in vibration of the apparatus and the well bore member.

Thus, while the use of apparatus for dislodging stuck components by vibration, for example, is known in the field of well drilling, there is no known apparatus, as pointed out above, which utilizes a technique such as vibration, to loosen a stuck fuel assembly in the core of a reactor, such that the axial force applied to the fuel assembly does not increase beyond a safe limit.

SUMMARY OF THE INVENTION

The present invention provides an improved reactor refueling method utilizing a fuel grapple mechanism that incorporates therein a pneumatic vibrator which enables additional withdrawal capability without exceeding the allowable axial force limit. Thus, the present invention provides increased capability for removing spent fuel assemblies wherein the friction loads thereof have increased due to the environment and the material behavior resulting from the fuel assemblies being irradiated in the reactor core. Vibration has been shown to be an effective means to reduce the effective coefficient of friction. By incorporating a pneumatic vibrator into the fuel grapple head, the withdrawal capability is increased. The only moving part in the vibrator is a steel ball, pneumatically driven by a gas around a track. Centrifugal force created by the ball is transmitted through the grapple to the fuel assembly handling socket, causing vibration of the fuel assembly and a reduction in the friction load involved in removable of the fuel assembly.

Therefore, it is an object of this invention to provide a reactor refueling method which utilizes vibration of the fuel assemblies being removed from a reactor core for reducing functional loads thereon.

A further object of the invention is to provide an improved refueling fuel grapple mechanism.

Another object of the invention is to provide a fuel grapple mechanism utilizing vibration techniques for reducing friction loading of the fuel assemblies during withdrawal from a reactor core.

Another object of the invention is to provide a refueling grapple mechanism utilizing a pneumatic vibrator in the grapple head enabling additional withdrawal capability without exceeding the allowable axial force limit.

Another object of the invention is to provide a vibrating fuel grapple for reducing the effective coefficient of friction resulting from the removal of fuel assemblies from a reactor core.

Another object of the invention is to provide a vibrating fuel assembly grapple wherein the only moving part in the vibrator is a steel ball pneumatically driven by gas, such as argon, around a track, such that centrifugal force created by the ball is transmitted through the grapple to the fuel assembly handling socket.

Other objects of the invention will become readily apparent to those skilled in the art from the following description and accompanying drawings.

BRIEF DESCRIPTION OF THE DRAWINGS

FIG. 1 is a sectional view of an embodiment of the vibrating fuel assembly grapple of the invention; and FIG. 2 is a view taken along the line 2—2 of FIG. 1.

DETAILED DESCRIPTION OF THE INVENTION

The invention involves a refueling method and apparatus for the removal of spent fuel assemblies from a reactor core by applying axial force and vibration to the spent fuel assemblies to overcome weight and frictional loads without exceeding the allowable axial force limit that can be safely applied to a fuel assembly without damage thereto or to adjacent assemblies. Vibration reduces the effective coefficient of friction created between adjacent fuel assemblies as they undergo irradiation within a reactor core which results in swelling and creep behavior. By the addition of vibrational action to the axial force applied to a spent fuel assembly undergoing removal, the withdrawal capability is greatly increased without exceeding the allowable axial force limit. Vibration is produced by incorporating into the fuel grapple mechanism a pneumatic vibrator involving a steel ball pneumatically driven around a track by a gas, such as argon used as the reactor cover gas, such that the centrifugal force created by the ball is transmitted through the grapple to the fuel assembly handling socket which in turn applies a vibration to the fuel assembly being removed. The gas utilized to drive the ball may be argon reactor cover gas.

Referring now to the drawings, the fuel grapple assembly generally indicated at 10 is shown extending through a hold down tube 11 into a fuel assembly 12. Fuel grapple 10 includes a casing or housing 13 composed of interconnecting sections 13a, 13b and 13c which is provided at its outer end (section 13c) with a grapple latch mechanism generally indicated at 14 and provided with a plurality of latches 15 (only one shown) adapted to engage with an annular notch 16 in a fuel handling socket or tube 17 of fuel assembly 12. As shown in FIG. 2, hold down tube 11 rests against adjacent fuel assemblies surrounding the one to which the grapple is engaged. Latch mechanism 14 is controlled by a push-pull latch actuator 18 such that movement of actuator 18 as indicated by the arrows moves collars 19 and 20 secured thereto to force latch 15 into engagement with notch 16, as shown for removal of the fuel assembly from a reactor core, not shown, or to disengage the latch 15, as conventionally known in the art. Fuel grapple 10 is also provided with a pneumatic vibrator mechanism generally indicated at 21 and located within casing 13 adjacent latch mechanism 14, with latch actuator 18 extending therethrough. As seen in FIGS. 1 and 2, pneumatic vibrator mechanism 21 includes a collar-shaped housing 22, secured intermediate casing sections 13b and 13c, having an annular groove 23 extending around its periphery and defining an annular, tapered raceway or track 24 on the interior surface thereof. The track 24 includes a centrally located annular groove 25 with a plurality of tangentially directed gas passageways 26 (two shown) extending between grooves 23 and 25 (see FIG. 2). A plurality of gas passageways 28 extend between groove 23 and an exterior surface 29 of housing 22 which are in communication with an annular chamber or groove 30 in casing section 13b which in turn is connected to a gas passage 31-32 having a fitting 33 secured thereto to which is connected a gas (such as argon or other cover gas, for example) inlet tube or line 34. A rotating ball 35 (constructed of steel for example) is rotatably positioned within track or raceway 24 and a seal assembly 36 is mounted in casing section 13c about latch actuator 18 to prevent leakage of the gas from the pneumatic vibrator mechanism 21 into the latch mechanism area of the grapple and the associated coolant (liquid sodium) about fuel assembly 12. Coolant vent passageways 37 and cooperating vent holes, 38 are located in grapple casing section 3c and hold down tube 11 to prevent entrapment of liquid sodium, for example, therein.

In operation, with the fuel grapple assembly inserted such that the latch mechanism 14 is engaged with fuel handling tube 17 of the fuel assembly 12 to be removed, and with the hold down tube 11 positioned against the outer surface of the adjacent fuel assemblies, as known in the art, the pneumatic vibrator mechanism 21 is activated by directing gas under pressure, such as argon, from a source, not shown, into tube 34, as indicated by the legend and arrow. The gas flows from tube 34 and fitting 33 through passages 32-31, chamber 30, passages 28, groove 23, tangential passages 26 and is directed against rotating ball 35 which drives the ball around track 24 as indicated by the arrows in FIG. 2. The gas is exhausted, as indicated by legend and arrow, through a chamber 40 defined within casing sections 13b and 13a and passes through a plurality of openings 41 in casing section 13a into the reactor cover gas, as indicated by legend and arrow. Centrifugal force created by rotating ball 35 being driven around track 24 produces a vibrating which is transmitted through the grapple assembly to the fuel assembly handling socket or tube 17. The vibration, as pointed out above, reduces the effective coefficient of friction between the fuel assemblies thereby reducing the friction load, thus enabling additional withdrawal capability without exceeding the allowable axial force limit applied to the fuel assembly being removed.

It has thus been shown that the present invention provides a refueling method an improved refueling fuel grapple mechanism for use in removing fuel assemblies from a reactor core which have swelled due to exposure to radiation, and thus difficult to remove due to friction loading, without exceeding the allowable safe axial force limit. This is accomplished by the incorporation of a pneumatic vibrator mechanism into the grapple wherein a rotating ball is driven around a track by means of a gas, the centrifugal force created thereby producing vibration in the grapple mechanism which is transmitted to the fuel assembly attached to the grapple.

While a particular embodiment of the invention has been illustrated and described, modifications will become apparent to those skilled in the art, and it is intended to cover in the appended claims all such modifications as come within the spirit and scope of the invention.

What we claim is:

1. A method for loosening a stuck fuel assembly in the core of a reactor and increasing the withdrawal capability without exceeding an allowable axial force safety limit exerted on a fuel assembly while removing same from a reactor core comprising the steps of: attaching a grapple mechanism to a fuel assembly to be removed, transmitting a vibrational force to the fuel assembly for loosening the assembly in a reactor core, and applying axial force to the fuel assembly for removing same from a reactor core without exceeding an allowable axial force safety limit.

2. The method defined in claim 1, wherein the step of transmitting the vibrational force is carried out by providing the grapple mechanism with a pneumatic vibrator mechanism, producing a centrifugal force by actuation of the pneumatic vibrator mechanism which is transmitted through the grapple mechanism to an attached fuel assembly.

3. The method defined in claim 2, wherein the step of producing a centrifugal force is carried out by positioning a rotatable ball in an annular track, and driving the ball around the track by directing gas under pressure thereagainst, thereby creating a centrifugal force.

4. In a grapple assembly for removing spent fuel assemblies from a reactor core which includes a latch mechanism for attaching the grapple assembly to a fuel assembly to be removed, and an actuator for the latch mechanism, the improvement comprising: means for loosening a stuck fuel assembly such that axial force applied for removing the fuel assembly does not increase beyond a safe limit, said means including a pneumatic vibrator mechanism positioned in said grapple assembly adjacent said latch mechanism, and means for activating said vibrator for producing a centrifugal force which is transmitted through said latch mechanism to produce a vibration of an associated fuel assembly causing loosening thereof within an associated reactor core.

5. The improvement defined in claim 4, wherein said pneumatic vibrator mechanism comprises a housing defining therein an annular track within which is located a rotating ball, gas passage means positioned peripherally of and tangentially with respect to said track, whereby said activating means allows gas under pressure to be directed through said passage means for driving said rotatable ball around said track producing said centrifugal force.

6. The improvement defined in claim 4, additionally including seal means positioned to prevent leakage of said gas into said latch mechanism.

7. The improvement defined in claim 5, wherein said track has a tapered configuration with an annular groove in the outer center section thereof in which said tangential gas passage means terminates.

8. The grapple assembly defined in claim 4, wherein said latch mechanism includes at least one latch means adapted to be engaged with an associated fuel assembly for removing such an assembly from an associated reactor core, and push-pull actuator means for moving said latch means, and wherein said pneumatic vibrator mechanism includes a housing surrounding a portion of said actuator means, and additionally including seal means positioned around a portion of said actuator means intermediate said vibrator mechanism and said latch means.

9. The assembly defined in claim 8, wherein said housing of said vibrator mechanism has a central annular opening therein defining an annular, tapered track, a rotatable ball positioned to travel in said annular track, a gas passage means positioned to direct gas under pressure against said ball for rotating same around said track, whereby centrifugal force created by the ball as it travels around said tract is transmitted through said housing to said latch mechanism for producing vibration of an associated fuel assembly when engaged with said latch means of said latch mechanism.

10. The assembly defined in claim 9, wherein said gas is composed of argon or other reactor cover gas.

* * * * *